US012795567B2

(12) United States Patent
Lu et al.

(10) Patent No.: US 12,795,567 B2
(45) Date of Patent: Nov. 10, 2026

(54) MULTI-LINK TIME SYNCHRONIZATION IN A WIRELESS NETWORK

(71) Applicant: MediaTek Singapore Pte. Ltd., Singapore (SG)

(72) Inventors: Kai Ying Lu, San Jose, CA (US); Chao-Chun Wang, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 890 days.

(21) Appl. No.: 18/073,010

(22) Filed: Dec. 1, 2022

(65) Prior Publication Data

US 2023/0180161 A1 Jun. 8, 2023

Related U.S. Application Data

(60) Provisional application No. 63/287,121, filed on Dec. 8, 2021.

(51) Int. Cl.
*H04W 56/00* (2009.01)
*H04W 52/02* (2009.01)

(52) U.S. Cl.
CPC ... *H04W 56/0015* (2013.01); *H04W 52/0216* (2013.01)

(58) Field of Classification Search
CPC ......... H04W 56/0015; H04W 52/0216; H04W 56/00; H04W 76/15; Y02D 30/70; H04J 3/0635
See application file for complete search history.

(56) References Cited

U.S. PATENT DOCUMENTS

2015/0110070 A1* 4/2015 Liu .................... H04W 80/045 370/328
2020/0045555 A1 2/2020 Huang et al.
2021/0007168 A1 1/2021 Asterjadhi et al.
2021/0250848 A1 8/2021 Seok et al.
2021/0314846 A1 10/2021 Chu et al.
2021/0321243 A1* 10/2021 Patil ..................... H04W 48/10

FOREIGN PATENT DOCUMENTS

WO 2021011476 A1 1/2021

OTHER PUBLICATIONS

Minyoung Park (Intel Corp): "Multi-Link TSF Discussion";IEEE Draft; vol. 802.11 EHT ;802.11be, No. 1 Jun. 9, 2020 pp. 1-9.
Liwen Chu, "CC36 comment resolution: Multi-Link Fragmentation", IEEE P802.11 Wireless LANs, 802.11-21/1508r2, Oct. 11, 2021.

* cited by examiner

*Primary Examiner* — Ayanah S George

(57) ABSTRACT

Embodiments of the present invention are drawn to systems, apparatus and methods that provide TSF information for a non-primary link to a non-AP STA operating on a primary link to avoid IDC interference and improve wireless throughput and efficiency. The TSF information includes a TSF offset value used to determining the timing of subsequent transmissions over different wireless links. The TSF offset value can be carried in a beacon frame, probe response frame, association frame, through a Reduced Neighbor Report element or a multi-link element, for example. Beacon frames can include timestamp and TSF offset information transmitted periodically. Some wireless links may share a TSF clock or have fixed TSF offsets.

17 Claims, 5 Drawing Sheets

MULTI-LINK TIME SYNCHRONIZATION IN A WIRELESS NETWORK

CROSS-REFERENCE TO RELATED APPLICATIONS

This application claims the benefit of and priority to provisional patent application Ser. No. 63/287,121, with filing date Dec. 8, 2021, which is hereby incorporated by reference in its entirety.

FIELD

Embodiments of the present invention generally relate to the field of wireless communications. More specifically, embodiments of the present invention relate to systems and methods of determining time synchronization information in a wireless network.

BACKGROUND

Modern electronic devices typically send and receive data with other electronic devices wirelessly using Wi-Fi, and many of these electronic devices are “dual band” devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

The use of a single band may not satisfy the bandwidth or latency needs of certain devices. Therefore, some developing approaches to wireless communication increase communication bandwidth by operating on multiple bands concurrently (technically called link aggregation or multi-link operation). Advantageously, multi-link operations can provide higher network throughput and improve network flexibility compared to traditional single link techniques for wireless communication.

A multi-link device (MLD) supports multi-link operation but may be affected by in-device coexistence (IDC) interference when the two links are close to each other. An MLD operating on two links with IDC interference cannot support simultaneous transmit and receive at the same time on the two links. These links are referred to as non-simultaneous transmit and receive (NSTR) links, and the MLD is referred to as an NSTR MLD. An AP MLD that experienced IDC interference when operating on an NSTR pair of links is referred to as an NSTR AP MLD. A NSTR AP MLD will designate one link of an NSTR link pair as the primary link, and the other link of the NSTR link pair is considered the non-primary or secondary link.

An NSTR AP MLD will typically transmit Beacon and Probe Response frames on the primary link and not on the non-primary link, and in some cases the non-primary link may be in a sleep or power-save mode. For a multi-link operation, time synchronization function (TSF) information of each link is provided from an AP MLD to a non-AP MLD to coordinate activities among multiple links. However, because an NSTR AP MLD may not transmit Beacon and Probe Response frames on the non-primary link of an NSTR link pair, another approach to communicating timing information for a non-primary link of an NSTR pair of links is desired.

SUMMARY

Accordingly, embodiments of the present invention are drawn to systems, apparatus and methods that provide TSF information for a non-primary link to a non-AP MLD through a non-AP STA affiliated with the non-AP MLD operating on a primary link to improve multiple wireless link operation d efficiency. The TSF information includes a TSF offset value used to determine the timing of subsequent transmissions over different wireless links. The TSF offset value can be carried in a beacon frame, probe response frame, or association frame, through a Reduced Neighbor Report element or a multi-link element, for example. Beacon frames can include timestamp and TSF offset information transmitted periodically. Some wireless links may share a TSF clock or have fixed TSF offsets.

According to one disclosed embodiment, a method of determining timing synchronization information for a wireless link of a multi-link device (MLD) operating in a wireless network is disclosed. The method includes transmitting a first frame over a primary wireless link of the wireless network for receipt by a non-AP MLD, where the first frame includes a time synchronization function (TSF) offset value for determining transmission timing of a secondary wireless link of the wireless network, and transmitting a second frame to the non-AP MLD over the secondary wireless link according to the TSF offset value.

According to some embodiments, the first frame includes one of: a beacon frame, a probe response frame, and association response frame.

According to some embodiments, the TSF offset value is transmitted within a reduced neighbor report (RNR) element.

According to some embodiments, the TSF offset value is transmitted within in a basic service set (BSS) parameters subfield of the RNR element.

According to some embodiments, the transmitting a second frame to the non-AP MLD is performed according to a timestamp corresponding to the primary link carried in a beacon frame.

According to some embodiments, the method includes the non-AP MLD synchronizing a transmission clock corresponding to the secondary wireless link according to the timestamp and the TSF offset value.

According to some embodiments, a first target wake time (TWT) is scheduled on the primary wireless link at a first starting time, a second TWT is scheduled on the secondary wireless link at a fixed offset value corresponding to the first starting time, and the second TWT begins at a starting time equal to a sum of: the starting time of the first TWT, the fixed offset value, and the TSF offset value.

According to some embodiments, the TSF offset value includes a value of 0, and the primary link and the secondary link share a TSF timer.

According to some embodiments, the first frame is transmitted without the TSF offset value.

According to some embodiments, the method includes the non-AP MLD adjusting a TSF timer of the secondary wireless link according to the TSF offset value.

According to some embodiments, the first frame includes an association response frame, and the TSF offset value is transmitted within in an STA profile subelement of a multi-link element in the association response frame.

According to some embodiments, the first frame includes a multi-link response frame, and the TSF offset value is transmitted within an STA profile subelement of a multi-link element in the multi-link response frame.

According to a different embodiment, a method of determining timing synchronization information for a wireless link of a multi-link device (MLD) operating in a wireless network is disclosed. The method includes receiving a first frame over a primary wireless link of the wireless network from an AP MLD, where the first frame includes a time synchronization function (TSF) offset value for determining transmission timing of a secondary wireless link of the wireless network, and receiving a second frame from the AP MLD over the secondary wireless link according to the TSF offset value.

According to some embodiments, a first target wake time (TWT) is scheduled on the primary wireless link at a first starting time, a second TWT is scheduled on the secondary wireless link at a fixed offset value corresponding to the first starting time, and the second TWT begins at a starting time equal to a sum of: the starting time of the first TWT, the fixed offset value, and the TSF offset value.

According to some embodiments, the TSF offset value includes a value of 0, and the primary link and the secondary link share a common TSF timer.

According to some embodiments, the TSF offset value is an integer, and the receiving a second frame from the AP MLD over the secondary wireless link includes adjusting a TSF timer of the secondary wireless link according to the TSF offset value.

According to another embodiment, an apparatus for wireless data transmission is disclosed. The apparatus includes a processor, a memory coupled to the processor operable to store data, and a plurality of radios under control of said processor and operable to perform synchronous wireless transmission. The processor is operable to transmit a first frame over a primary wireless link of the wireless network for receipt by a non-AP MLD, the first frame includes a time synchronization function (TSF) offset value for determining transmission timing of a secondary wireless link of the wireless network, and transmit a second frame to the non-AP MLD over the secondary wireless link according to the TSF offset value.

According to some embodiments, a first target wake time (TWT) is scheduled on the primary wireless link at a first starting time, a second TWT is scheduled on the secondary wireless link at a fixed offset value corresponding to the first starting time, and the second TWT begins at a starting time equal to a sum of: the starting time of the first TWT, the fixed offset value, and the TSF offset value.

According to some embodiments, the TSF offset value includes a value of 0, and the primary link and the secondary link share a time synchronization function (TSF) timer.

According to some embodiments, the TSF offset value is an integer, and the non-AP MLD adjusts a TSF timer of the secondary wireless link according to the TSF offset value.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
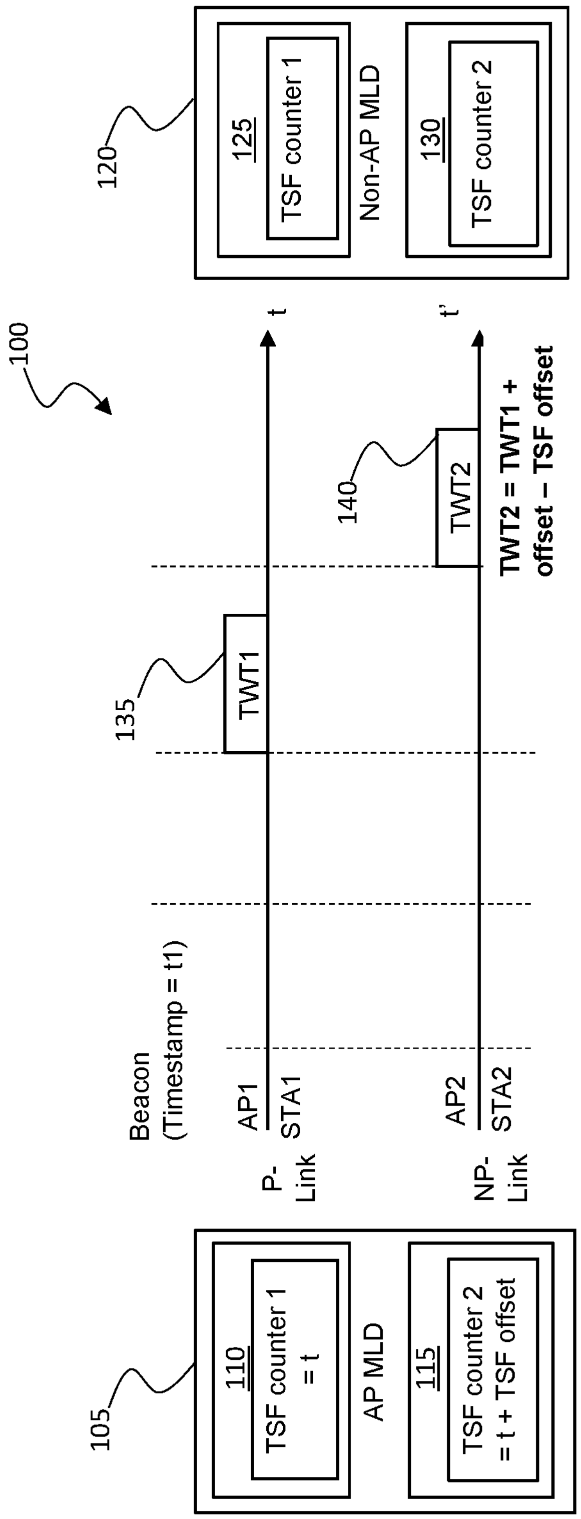
FIG. 1 is a timing diagram depicting exemplary wireless transmissions between an AP MLD and a non-AP MLD including timing value information for performing synchronized multi-link transmissions according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 3 and 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Techniques for Multi-Link Time Synchronization Using a Primary Wireless Link

Embodiments of the present invention are drawn to systems, apparatus and methods that provide TSF information for a non-primary link to a non-AP wireless station (STA) operating on a primary link to avoid and/or eliminate/reduce IDC interference and improve wireless throughput and efficiency. The TSF information includes a TSF offset value used to determine the timing of subsequent transmissions over different wireless links. The TSF offset value can be carried in a beacon frame, probe response frame, or association frame, through a Reduced Neighbor Report element or multi-link element, for example. Beacon frames can include timestamp and TSF offset information transmitted periodically. Some wireless links may share a TSF clock or have a fixed offset.

FIG. 1 is a timing diagram depicting exemplary wireless transmissions 100 between an AP MLD and a non-AP MLD including timing value information for performing synchronized multi-link transmissions according to embodiments of the present invention. In the general example of FIG. 1, it is assumed that APs of AP MLD 105 have a fixed TSF offset value ("TSF offset") between each link, in addition to a scheduled offset value ("offset") for scheduling subsequent transmissions. AP 110 operating on the primary link announces its TSF value and TSF offset between the primary link and non-primary link in TWT1 135. For example, STA 125 of non-AP MLD 120 can receive a beacon on the primary link and synchronize the clocks of the non-primary link based on the received timestamp and TSF offset. For example, the starting time of TWT2 on the non-primary link can be determined based on the value of TWT1 and timing information (e.g., an offset) provided over the primary link. In the example of FIG. 1, TWT1 on the primary link and TWT2 on the non-primary link are scheduled using an offset value according to the formula: TWT2=TWT1+offset−TSF offset.

According to embodiments, for an NSTR AP MLD, the AP affiliated with the NSTR AP MLD and that is operating on the primary link acts as the timing master for performing time synchronization functions, and APs affiliated with an NSTR AP MLD are synchronized to a common clock. An AP affiliated with an NSTR AP MLD that is operating on the primary link of an NSTR link pair indicates the TSF time difference between the primary link and non-primary link. The TSF time difference (offset) between the primary link and non-primary link of the NSTR link pair can be a fixed offset, for example, that is specific to a link. According to some embodiments, the AP operating on the primary link periodically transmits beacon frames carrying a timestamp and TSF offset value. For example, TSF offset values can be carried in a neighbor AP information field of a Reduced Neighbor Report (RNR) element that is transmitted in Beacon frames and/or Probe Response frames sent by the AP on the primary link.

A non-AP STA affiliated with a non-AP MLD that is operating on the primary link maintains a TSF timer and adjusts the timer based on timestamps included in Beacon frames transmitted by an associated AP MLD to comply with the TSF timer accuracy rules. A non-AP STA affiliated with the non-AP MLD operating on the non-primary link maintains a TSF timer and adjusts the timer based on the TSF timer (timestamp) of the primary link and the TSF offset indicated by the associated AP MLD. Alternatively, another non-AP STA affiliated with the same non-AP MLD that is operating on the non-primary link can share the same TSF timer without adjusting the timer based on the TSF timer on the primary link and TSF offset indicated by the associated AP MLD (e.g., no offset, offset=0, or no offset value indicated), according to some embodiments.

As depicted in Table I, a TSF offset subfield can be included in a Target Beacon Transmit Time (TBTT) Information field of a Neighbor AP Information field corresponding to non-primary link in an RNR element. According to some embodiments, the TSF offset subfield is an integer that indicates the TSF offset value for the specified link (e.g., primary link). The offset value can be expressed in 2$s$ complement in μs, for example. The TBTT Information field corresponding to another link (e.g., the non-primary link) is an integer and may include the TSF offset subfield and the MLD parameters subfield. The TBTT Information Length subfield value is 4 (4 Octets).

TABLE I

| TBTT Information Length subfield value | TBTT Information field contents |
|---|---|
| 3 | MLD Parameters subfield |
| 4 | TSF offset subfield<br>MLD Parameters subfield |

According to other embodiments, as depicted in Table II, a TSF offset subfield is included in a BSS Parameters subfield of a TBTT Information field of a Neighbor AP Information field corresponding to a non-primary link in an RNR element. The TBTT Information field is an integer and may further include a BSS Parameters subfield and an MLD parameters subfield corresponding to a specified link (e.g., non-primary link). The TBTT Information Length subfield value is typically 4 to 8 octets depending on the number of octets used for the BSS Parameters subfield. The BSS Parameters Subfield includes a TSF offset subfield and optionally a link unavailability indication subfield. The TSF offset subfield is an integer that indicates the TSF offset value in relation to a specified link (e.g., the primary link).

TABLE II

| TBTT Information Length subfield value | TBTT Information field contents |
|---|---|
| 3 | MLD Parameters subfield |
| 8 | BSS Parameters subfield<br>MLD Parameters subfield |

Figure 2:
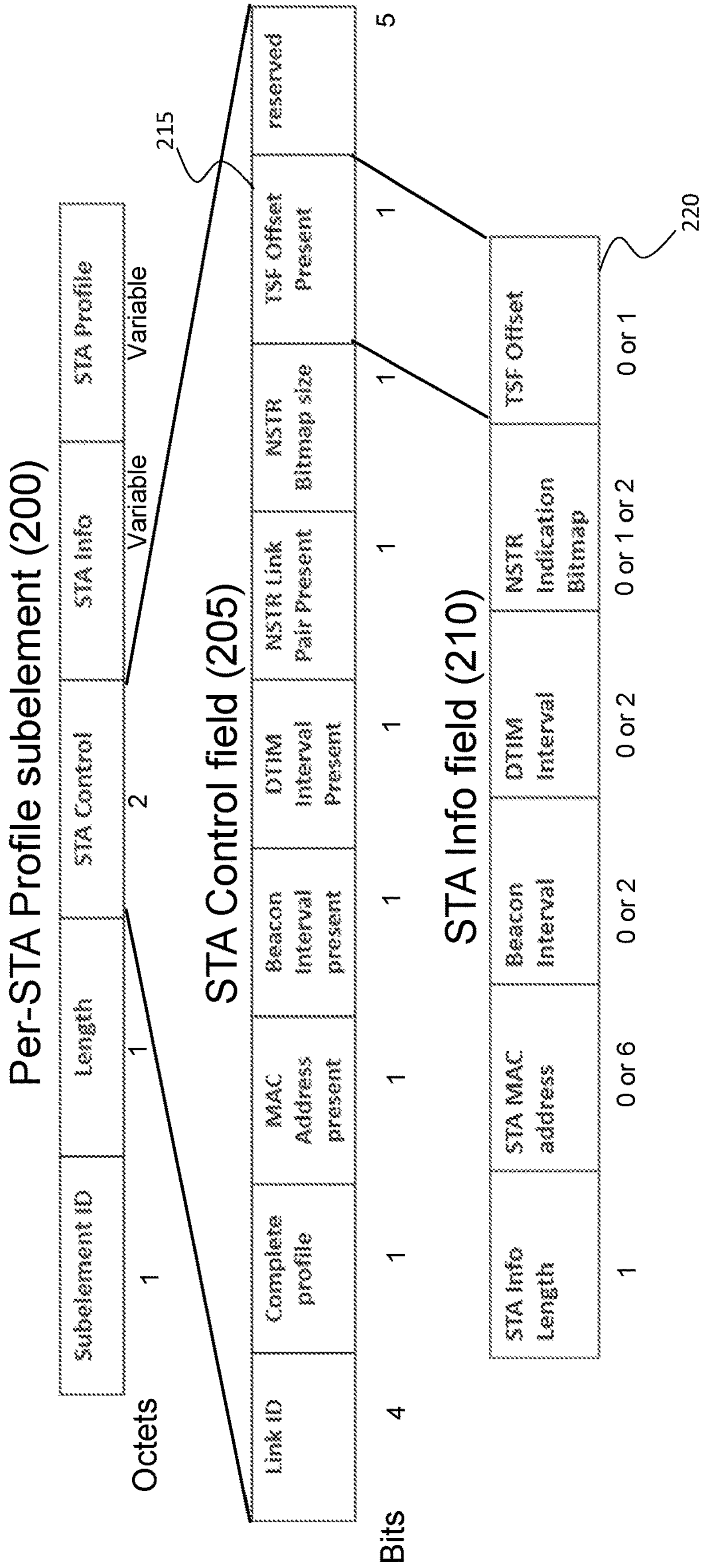
FIG. 2 is a block diagram depicting an exemplary per-STA profile subelement for transmitting TSF information (e.g., offset information) in an STA info field according to embodiments of the present invention.

In yet other embodiments, a TSF offset subfield is included in a STA info field of an per-STA profile subelement corresponding to the non-primary link for a specific STA. The STA info field may be carried in a multi-link element of a multi-link response frame or an association response frame at the time of association with an AP MLD, for example. FIG. 2 is a block diagram depicting an exemplary per-STA profile subelement 200 for transmitting TSF information (e.g., offset information) in an STA info field 210 according to embodiments of the present invention. TSF Offset Present subfield 215 in STA Control field 205 of the Per-STA Profile subelement 200 indicates whether the TSF Offset subfield 220 is present or not in the STA Info field 210 of the Per-STA Profile subelement 200. TSF Offset subfield 220 is an integer that indicates the TSF offset value between a link (e.g., the non-primary link) and the "reporting link" used to transmit the STA profile subelement 200 (e.g., primary link).

Figure 3:
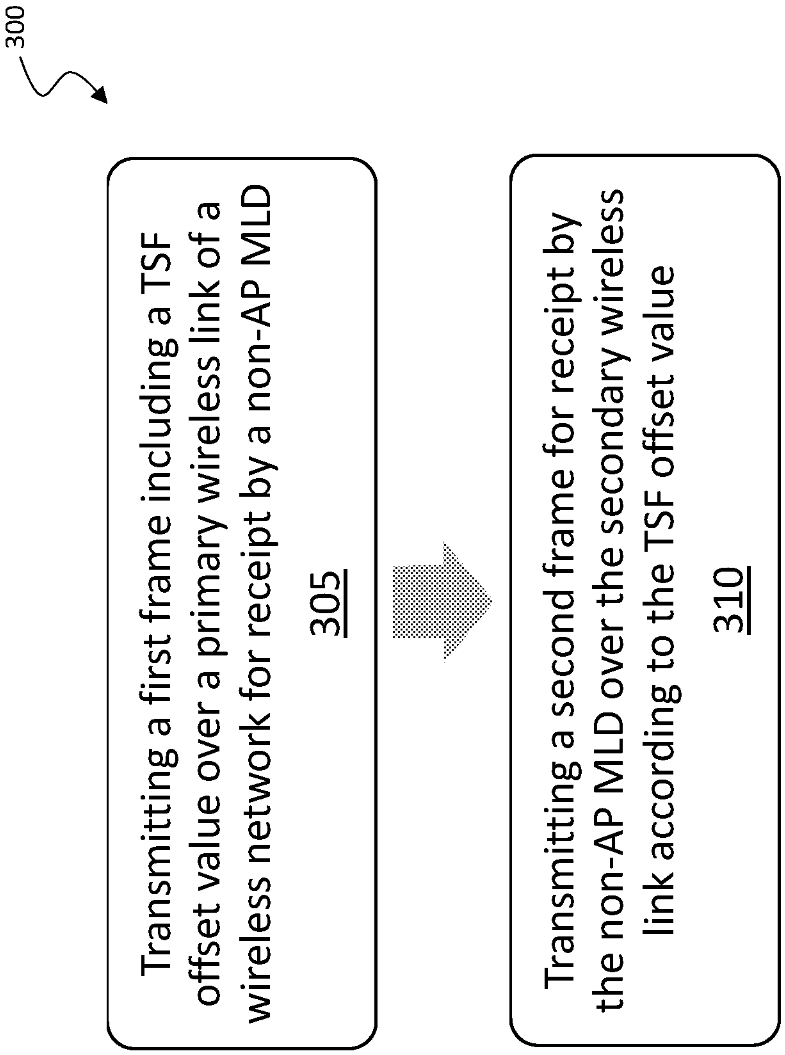
FIG. 3 is a flowchart of an exemplary sequence of computer implemented steps of a process for providing time synchronization information (e.g., offset information) performed by an AP MLD according to embodiments of the present invention.

FIG. 3 is a flowchart of an exemplary sequence of computer implemented steps of a process 300 for providing time synchronization information (e.g., offset information) performed by an AP MLD according to embodiments of the present invention. The time synchronization information can include a TSF offset value carried over a reporting wireless link (e.g., a primary wireless link) that is used to synchronize transmissions over another wireless link of the multi-link device (e.g., a secondary wireless link).

At step 305, the AP MLD transmits a first frame including a TSF offset value over a primary wireless link of a wireless network for receipt by a non-AP MLD. The TSF offset value can be carried in a RNR element of a beacon or probe response frame, or in a per-STA profile subelement of a multi-link element carried in an association response frame or a multi-link probe response frame, for example.

At step 310, the AP MLD transmits a second frame to the non-AP MLD over a secondary wireless link according to the TSF offset value. For example, the first frame can be transmitted at a first target wake time (TWT), and the second frame can be transmitted at a second TWT. According to some embodiments, the second TWT is equal to the sum of: the first TWT, a scheduled offset value, and the TSF offset value. According to some embodiments, different wireless links may share a TSF clock or have fixed TSF offsets.

Figure 4:
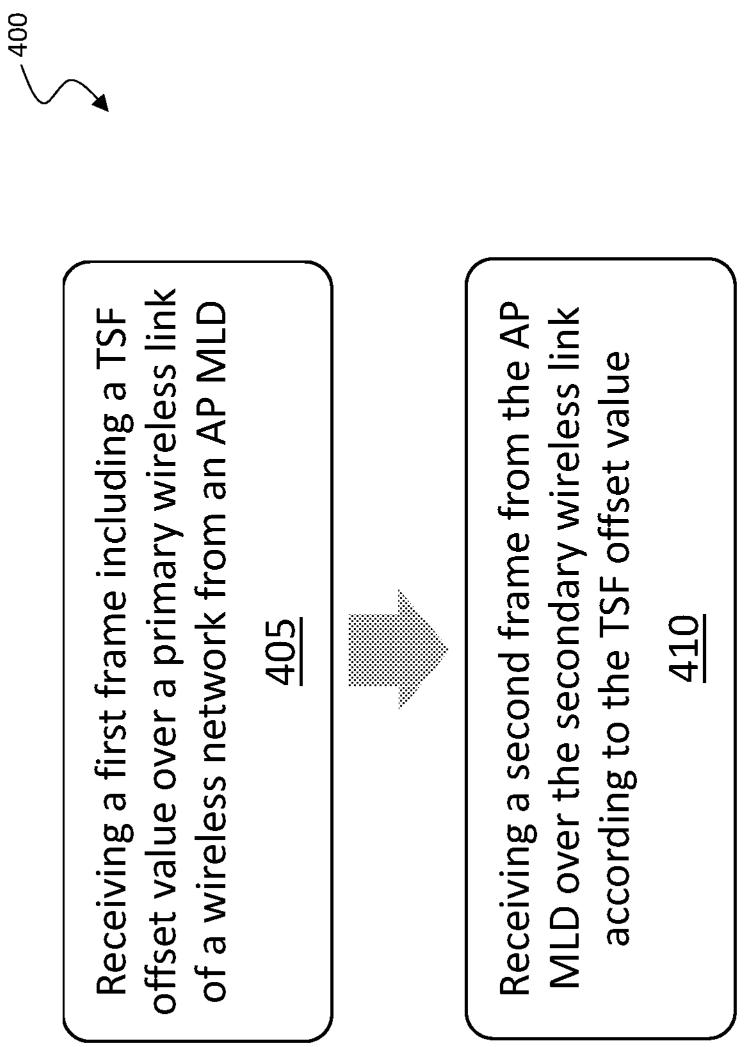
FIG. 4 is a flowchart of an exemplary sequence of computer implemented steps of a process for determining time synchronization information (e.g., offset information) performed by a non-AP MLD according to embodiments of the present invention.

FIG. 4 is a flowchart of an exemplary sequence of computer implemented steps of a process 400 for determining time synchronization information (e.g., offset information) performed by a non-AP MLD according to embodiments of the present invention. The time synchronization information can include a TSF offset value carried over a reporting wireless link (e.g., a primary wireless link) that is used to synchronize transmissions over another wireless link of the multi-link device (e.g., a secondary wireless link).

At step 405, the non-AP MLD receives first frame including a TSF offset value over a primary wireless link of a wireless network from an AP MLD. The TSF offset value can be carried in a RNR element of a beacon or probe response frame, or in a per-STA profile subelement of a multi-link element carried in an association response frame or a multi-link probe response frame, for example.

At step 410, the non-AP MLD receives a second frame from the AP MLD according to the TSF offset value. The first frame can be received at a first target wake time (TWT), and the second frame can be received at a second TWT. According to some embodiments, the second TWT is equal to the sum of: the first TWT, a scheduled offset value, and the TSF offset value. According to some embodiments, different wireless links may share a TSF clock or have fixed TSF offsets. According to some embodiments, step 410 includes the non-AP MLD waking from a sleep or power-save mode to listen on the secondary wireless link responsive to the timing information of the first frame received in step 405.

Exemplary Computer Controlled System

Figure 5:
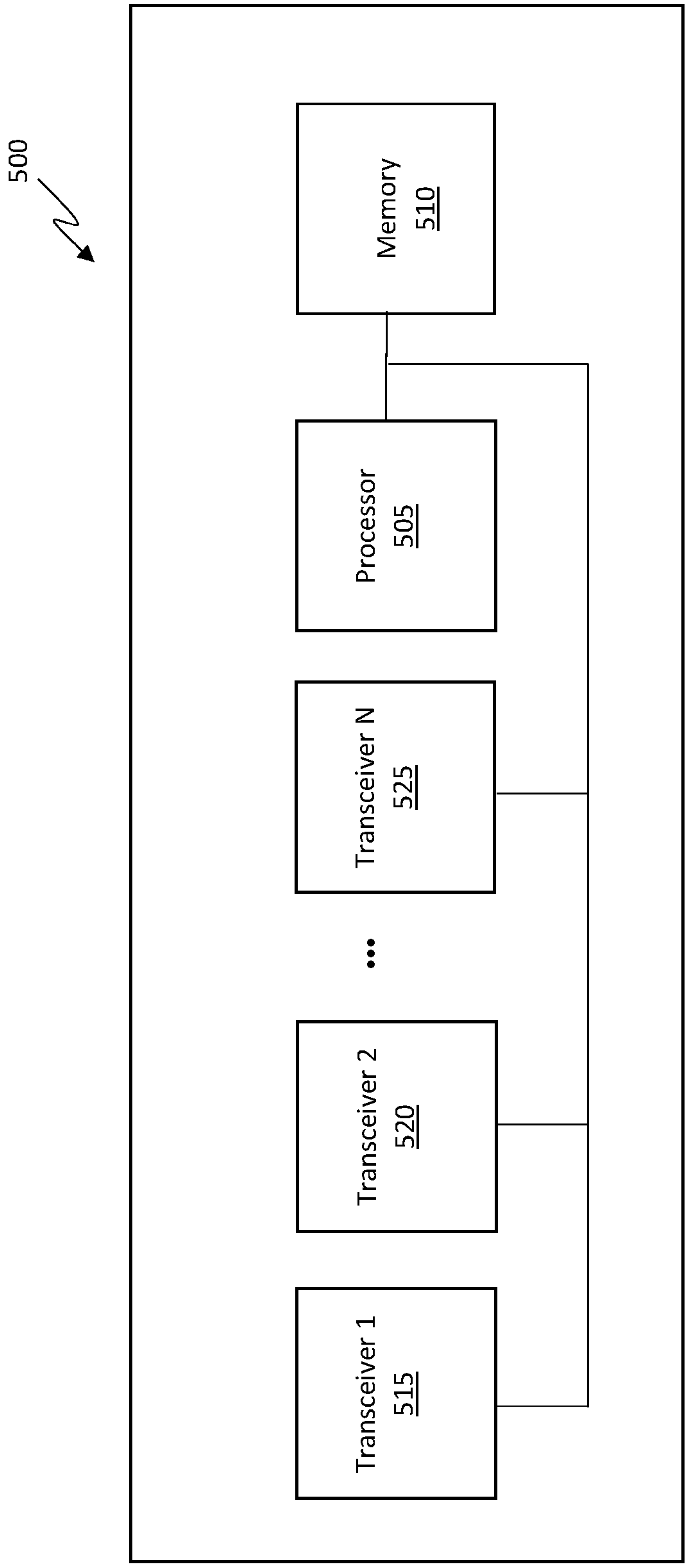
FIG. 5 is a block diagram depicting an exemplary computer system platform upon which embodiments of the present invention may be implemented.

FIG. 5 depicts an exemplary wireless multi-link device 500 upon which embodiments of the present invention can be implemented. Embodiments of the present invention are drawn to wireless devices capable of transmitting and/or receiving timing synchronization information to used determine the timing of transmissions performed over different links, for example, to avoid IDC interference. The time synchronization information can include a TSF offset value carried over a reporting wireless link (e.g., a primary wireless link) that is used to synchronize transmissions over another wireless link of the multi-link device (e.g., a secondary wireless link).

Wireless device 500 includes a processor 505 for running firmware, software applications, and optionally an operating system. Memory 510 can include read-only memory and/or random-access memory, for example, to store executable machine code and data (e.g., tables of index values) for use by the processor 505 and data received or transmitted by one or more radios.

In the example of FIG. 5, Radios 515, 520, and 525 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). One radio can be designated to communicate wirelessly over a primary wireless link while the other radio or radios operate over secondary wireless links or are in a sleep or power-save mode, according to embodiments. Some embodiments of the present invention can be performed by a multi-link device operating on a pair of STR links that perform time synchronization functions in the same way as a pair of NSTR links (e.g., regarding determining TSF Information) for improving throughput and network efficiency. In this case, the links are not considered to be primary or secondary links.

Embodiments of the present invention are thus described. While the present invention has been described in particular embodiments, it should be appreciated that the present invention should not be construed as limited by such embodiments, but rather construed according to the following claims.

What is claimed is:

1. A method of determining timing synchronization information for a wireless link of a multi-link device (MLD) operating in a wireless network, the method comprising:

transmitting a first frame over a primary wireless link of the wireless network for receipt by a non-AP MLD, wherein the first frame comprises a time synchronization function (TSF) offset value for determining transmission timing of a secondary wireless link of the wireless network; and transmitting a second frame to the non-AP MLD over the secondary wireless link according to the TSF offset value, wherein the TSF offset value comprises a value of 0, and wherein the primary link and the secondary link share a TSF timer.

2. The method of claim 1, wherein the first frame comprises one of: a beacon frame and a probe response frame, and association response frame.

3. The method of claim 2, wherein the TSF offset value is transmitted within a reduced neighbor report (RNR) element.

4. The method of claim 3, wherein the TSF offset value is transmitted within in a basic service set (BSS) parameters subfield of the RNR element.

5. The method of claim 1, wherein the transmitting a second frame to the non-AP MLD is performed according to a timestamp corresponding to the primary link carried in a beacon frame.

6. The method of claim 5, further comprising the non-AP MLD synchronizing a transmission clock corresponding to the secondary wireless link according to the timestamp and the TSF offset value.

7. The method of claim 1, wherein a first target wake time (TWT) is scheduled on the primary wireless link at a first starting time, wherein a second TWT is scheduled on the secondary wireless link at a fixed offset value corresponding to the first starting time, and wherein the second TWT begins at a starting time equal to a sum of: the starting time of the first TWT, the fixed offset value, and the TSF offset value.

8. The method of claim 1, wherein the first frame is transmitted without the TSF offset value.

9. The method of claim 1, further comprising the non-AP MLD adjusting a TSF timer of the secondary wireless link according to the TSF offset value.

10. The method of claim 1, wherein the first frame comprises an association response frame, and wherein the TSF offset value is transmitted within in an STA profile subelement of a multi-link element in the association response frame.

11. The method of claim 1, wherein the first frame comprises a multi-link response frame, and wherein the TSF offset value is transmitted within an STA profile subelement of a multi-link element in the multi-link response frame.

12. A method of determining timing synchronization information for a wireless link of a multi-link device (MLD) operating in a wireless network, the method comprising:

receiving a first frame over a primary wireless link of the wireless network from an AP MLD, wherein the first frame comprises a time synchronization function (TSF) offset value for determining transmission timing of a secondary wireless link of the wireless network; and receiving a second frame from the AP MLD over the secondary wireless link according to the TSF offset value, wherein the TSF offset value comprises a value of 0, and wherein the primary link and the secondary link share a common TSF timer.

13. The method of claim 12, wherein a first target wake time (TWT) is scheduled on the primary wireless link at a first starting time, wherein a second TWT is scheduled on the secondary wireless link at a fixed offset value corresponding to the first starting time, and wherein the second TWT begins at a starting time equal to a sum of: the starting time of the first TWT, the fixed offset value, and the TSF offset value.

14. The method of claim 12, wherein the TSF offset value is an integer, and wherein the receiving a second frame from the AP MLD over the secondary wireless link comprises adjusting a TSF timer of the secondary wireless link according to the TSF offset value.

15. An apparatus for wireless data transmission, the apparatus comprising:

a processor;

a memory coupled to the processor operable to store data; and a plurality of radios under control of said processor and operable to perform synchronous wireless transmission, and wherein the processor is operable to:

transmit a first frame over a primary wireless link of the wireless network for receipt by a non-AP MLD, wherein the first frame comprises a time synchronization function (TSF) offset value for determining transmission timing of a secondary wireless link of the wireless network; and transmit a second frame to the non-AP MLD over the secondary wireless link according to the TSF offset value, wherein the TSF offset value comprises a value of 0, and wherein the primary link and the secondary link share a TSF timer.

16. The apparatus of claim 15, wherein a first target wake time (TWT) is scheduled on the primary wireless link at a first starting time, wherein a second TWT is scheduled on the secondary wireless link at a fixed offset value corresponding to the first starting time, and wherein the second TWT begins at a starting time equal to a sum of: the starting time of the first TWT, the fixed offset value, and the TSF offset value.

17. The apparatus of claim 15, wherein the TSF offset value is an integer, and wherein the non-AP MLD adjusts a TSF timer of the secondary wireless link according to the TSF offset value.

* * * * *